US009952822B2

(12) United States Patent
Nakashima

(10) Patent No.: US 9,952,822 B2
(45) Date of Patent: Apr. 24, 2018

(54) DISPLAY DEVICE AND POS TERMINAL DEVICE

(71) Applicant: NEC Platforms, Ltd., Kawasaki-shi, Kanagawa (JP)

(72) Inventor: Takashi Nakashima, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 0 days.

(21) Appl. No.: 15/307,487

(22) PCT Filed: Jul. 21, 2015

(86) PCT No.: PCT/JP2015/003639
§ 371 (c)(1),
(2) Date: Oct. 28, 2016

(87) PCT Pub. No.: WO2016/067491
PCT Pub. Date: May 6, 2016

(65) Prior Publication Data
US 2017/0060516 A1    Mar. 2, 2017

(30) Foreign Application Priority Data
Oct. 30, 2014    (JP) .................................. 2014-221538

(51) Int. Cl.
*G06F 3/14*    (2006.01)
*G07G 1/01*    (2006.01)
(Continued)

(52) U.S. Cl.
CPC ............. *G06F 3/1423* (2013.01); *G07G 1/01* (2013.01); *H05K 5/0017* (2013.01);
(Continued)

(58) Field of Classification Search
CPC ................. G06F 3/1423; G06F 1/1601; G06F 2200/1612; H05K 5/0217; H05K 5/0017;
(Continued)

(56) References Cited

U.S. PATENT DOCUMENTS 2,594,605 A * 4/1952 Zoppelt .................. A47H 1/022
211/123
3,355,136 A * 11/1967 Staples ................ F16M 11/046
248/352
(Continued)

FOREIGN PATENT DOCUMENTS

CN    102345782 A    2/2012
CN    103858152 A    6/2014
(Continued)

OTHER PUBLICATIONS

International Search Report for PCT/JP2015/003639 dated Aug. 25, 2015 [PCT/ISA/210].
(Continued)

*Primary Examiner* — Adrian S Wilson
*Assistant Examiner* — Abishek Rathod
(74) *Attorney, Agent, or Firm* — Sughrue Mion, PLLC

(57)    ABSTRACT

The display device includes a display unit including a screen configured to display information; a support column having a tubular shape and being configured to support the display unit at a top end portion of the support column; and a support base configured to support the support column and including a tubular portion that is insertable into and removable from a bottom end portion of the support column. The display device is configured such that the support column is reinserted into the tubular portion of the support base, to thereby enable the screen of the display unit to be faced at a plurality of angles having a tubular axis of the tubular portion as a center.

7 Claims, 7 Drawing Sheets

(51) Int. Cl.
 *H05K 5/00* (2006.01)
 *H05K 5/02* (2006.01)
(52) U.S. Cl.
 CPC ... *H05K 5/0217* (2013.01); *G09G 2300/0421* (2013.01); *Y10S 248/917* (2013.01)
(58) Field of Classification Search
 CPC ............. Y10S 248/919; Y10S 248/917; A47B 2200/0088; A47B 81/005; A47F 7/00; G07G 1/01
 USPC ............ 248/221.11, 222.11, 222.12, 222.52, 248/125.1, 917; 174/70 R
 See application file for complete search history.

(56) References Cited

U.S. PATENT DOCUMENTS

| | | | | |
|---|---|---|---|---|
| 5,751,548 | A * | 5/1998 | Hall | F16C 11/10 248/122.1 |
| 6,370,020 | B1 * | 4/2002 | Toukairin | F16M 11/08 174/86 |
| 7,460,361 | B2 * | 12/2008 | Yiu | F16M 11/041 248/917 |
| 7,946,542 | B1 * | 5/2011 | Chapman | B60R 11/0252 248/122.1 |
| 2001/0023914 | A1 * | 9/2001 | Oddsen, Jr. | F16M 11/10 248/274.1 |
| 2007/0215776 | A1 * | 9/2007 | Chen | F16B 7/1427 248/404 |
| 2012/0020046 | A1 | 1/2012 | Takashima | |
| 2012/0140389 | A1 * | 6/2012 | Hwang | F16M 11/22 361/679.01 |
| 2014/0254076 | A1 | 9/2014 | Iwamoto et al. | |

FOREIGN PATENT DOCUMENTS

| | | |
|---|---|---|
| JP | 58-020987 Y2 | 5/1983 |
| JP | 61-189387 U | 11/1986 |
| JP | 10-027283 A | 1/1998 |
| JP | 2000-244146 A | 9/2000 |
| JP | 2013-012121 A | 1/2013 |

OTHER PUBLICATIONS

Written Opinion for PCT/JP2015/003639 dated Aug. 25, 2015 [PCT/ISA/237].

Communication dated Oct. 10, 2017 from the State Intellectual Property Office of the P.R.C. In counterpart Application No. 201580021641.8.

* cited by examiner

DISPLAY DEVICE AND POS TERMINAL DEVICE

CROSS REFERENCE TO RELATED APPLICATIONS

This application is a National Stage of International Application No. PCT/JP2015/003639 filed Jul. 21, 2015, claiming priority based on Japanese Patent Application No. 2014-221538 filed Oct. 30, 2014, the contents of all of which are incorporated herein by reference in their entirety.

TECHNICAL FIELD

This invention relates to a display device to be applied to an electronic device, e.g., a POS terminal device.

BACKGROUND ART

Among point of sale (POS) terminal devices, for example, a POS terminal device to be used for payment settlement at a store is a device that includes a customer display device configured to mainly display information to customers purchasing from the store in addition to a display device configured to display information to an operator (store clerk) (hereinafter also simply referred to as "display device").

The customer display device includes, for example, a display unit including a display device, e.g., a vacuum fluorescent display (VFD), and a support column which is mounted to a POS terminal device main body, and is configured to support the display unit so that the display unit is positioned above the POS terminal device main body. An electronic circuit or the like of the POS terminal device and the display device of the display unit are electronically connected to each other via a cable which is housed in the support column.

After the POS terminal device is installed on a counter or the like, in some cases, the display unit of the customer display device needs to be adjusted so as to be positioned at an angle (hereinafter also simply referred to as "angle") in a horizontal direction at which the customer can easily see a screen of the display unit.

This type of customer display device is, for example, disclosed in Patent Document 1. In Patent Document 1, there is disclosed a rotary display device for a cash register having a structure in which a supporting shaft is rotatable.

PRIOR ART DOCUMENT(S)

Patent Document(s)

Patent Document 1: JP-A-H10-027283

SUMMARY OF THE INVENTION

Problem to be Solved by the Invention

A display screen of the customer display device basically faces a customer side that is opposite to a store clerk side. However, depending on a state of installation of the POS terminal device within a store, the display screen may be required to display information to a customer in a direction close to a direction of the store clerk side opposite to (180 degrees different from) the usual direction of the customer side.

In order to enable the display unit to face also in the direction close to the direction of the store clerk side opposite to the usual customer side, the display unit needs to be configured such that the display unit is rotatable in a range of 360 degrees or more about the support column. However, due to reasons related to cost and configuration, it is difficult for the display unit to achieve a rotation range of 360 degrees or more.

This invention has been made in view of the above-mentioned situation, and it is an object of this invention to provide a display device in which a display unit can be faced in an arbitrary direction, similarly to a case in which the display unit is rotatable by 360 degrees or more, even when the display device includes a display unit that can only be rotated less than 360 degrees.

A further object of this invention is to provide a POS terminal device including the above-mentioned display device.

According to an aspect of this invention, there is provided a POS terminal device a display device, comprising a display unit comprising a screen configured to display information, a support column having a tubular shape and being configured to support the display unit at a top end portion of the support column, and a support base comprising a tubular portion that is insertable into and removable from a bottom end portion of the support column and being configured to support the support column. The display device is configured such that the support column is reinserted into the tubular portion of the support base, to thereby enable the screen of the display unit to be faced toward a plurality of angles having a tubular axis of the tubular portion as a center.

According to another aspect of this invention, there is provided a POS terminal device comprising the display device stated above.

Effect of the Invention

According to this invention, there can be obtained the display device in which the display unit can be faced in an arbitrary direction, similarly to a case in which the display unit is rotatable by 360 degrees or more, even when the display device includes the display unit that can only be rotated by less than 360 degrees.

MODE FOR EMBODYING THE INVENTION

A display device according to this invention includes a display unit including a screen configured to display information, a support column having a tubular shape and being configured to support the display unit at a top end portion of the support column, and a support base configured to support the support column. The support base includes a tubular portion that is insertable into and removable from a bottom end portion of the support column. The support column is reinserted into the tubular portion of the support base, to thereby enable the screen of the display unit to be faced at a plurality of angles (in the following example, two opposite directions) having a tubular axis of the tubular portion as a center.

With the above-mentioned configuration, the display device enables the display unit to be faced in arbitrary directions (at arbitrary angles), similarly to a case in which the display unit is rotatable by 360 degrees or more, even when the display device includes a display unit that can only be rotated less than 360 degrees.

Therefore, for example, a display unit already designed or manufactured to have a rotation range of less than 360 degrees and that is mounted to an existing type of electronic device, e.g., a POS terminal device, can achieve a rotation range of substantially 360 degrees or more even when applied to a new type of equipment. As a result, components can be used in common.

Now, a more specific embodiment of the display device according to this invention is described with reference to the drawings.

Figure 1:
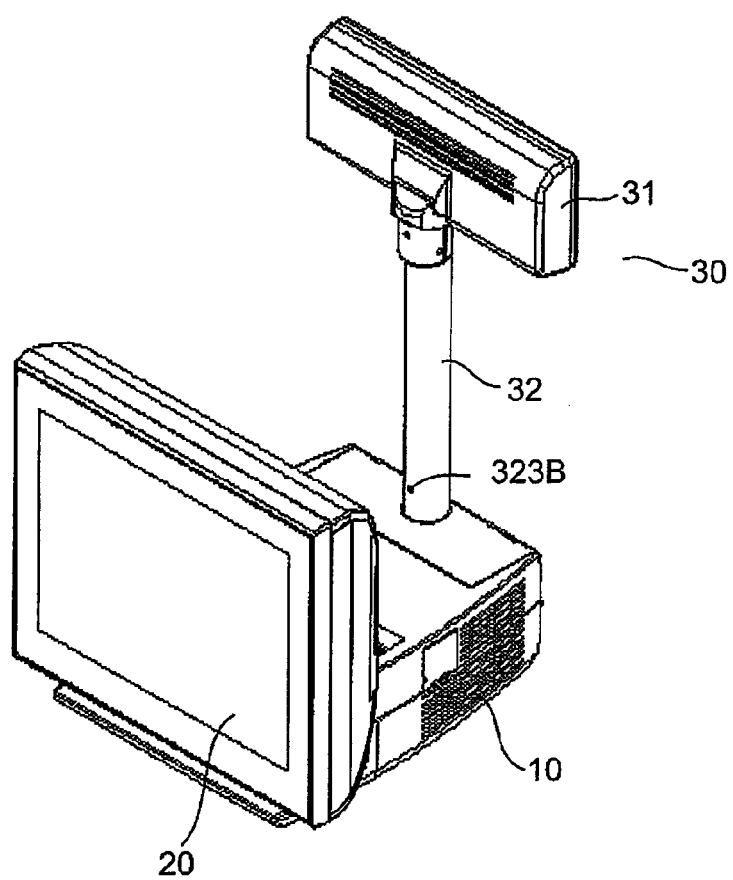
FIG. 1 is a perspective view of a POS terminal device to which a display device according to an embodiment of this invention is applied, for illustrating a state in which a customer display device is faced toward a customer side.

As illustrated in FIG. 1, a display device 30 according to an embodiment of this invention is applicable to the POS terminal device as a customer display device. The POS terminal device illustrated in FIG. 1 includes a POS terminal device main body 10, a display device 20 serving as a store-clerk display device including a screen configured to display information to a store clerk, and a display device 30 serving as the customer display device configured by the display device 30 and including a display unit 31 including a screen configured to display information to a customer. In this example, the display device 20 has a liquid crystal display with a touch panel serving as a displaying device. Further, the display device 30 has a VFD as a display device.

Figure 2:
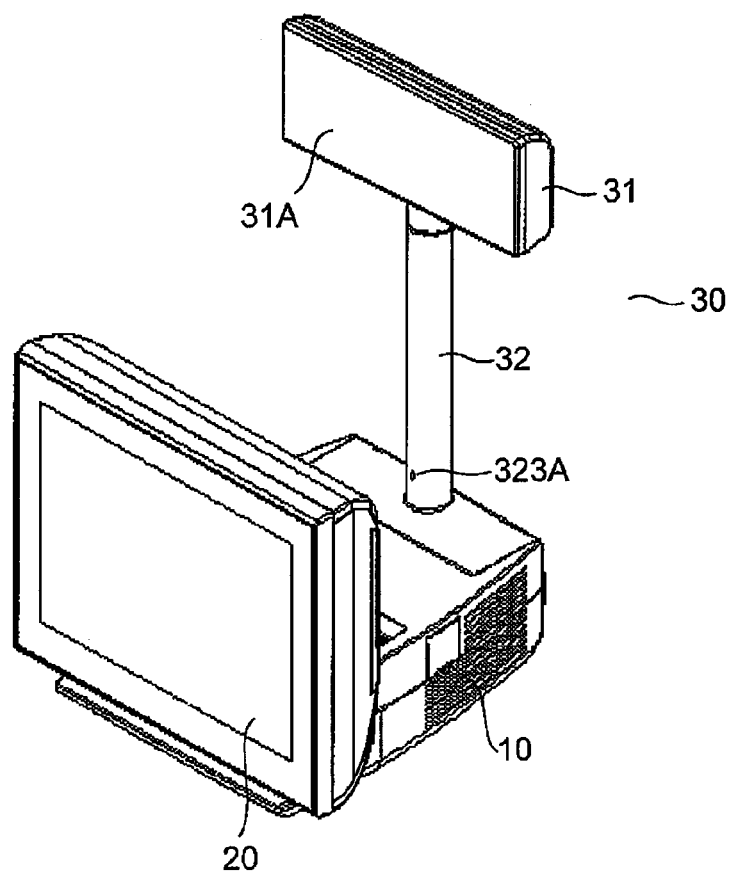
FIG. 2 is a perspective view of the POS terminal device to which the display device according to the embodiment of this invention is applied, for illustrating a state in which the customer display device is faced toward a store clerk side.

FIG. 1 is an illustration of a state in which the screen of the display unit 31 of the display device 30 is faced toward a customer side. On the other hand, FIG. 2 is an illustration of a state in which a screen 31A of the display unit 31 of the display device 30 is faced toward a store clerk side.

Figure 3:
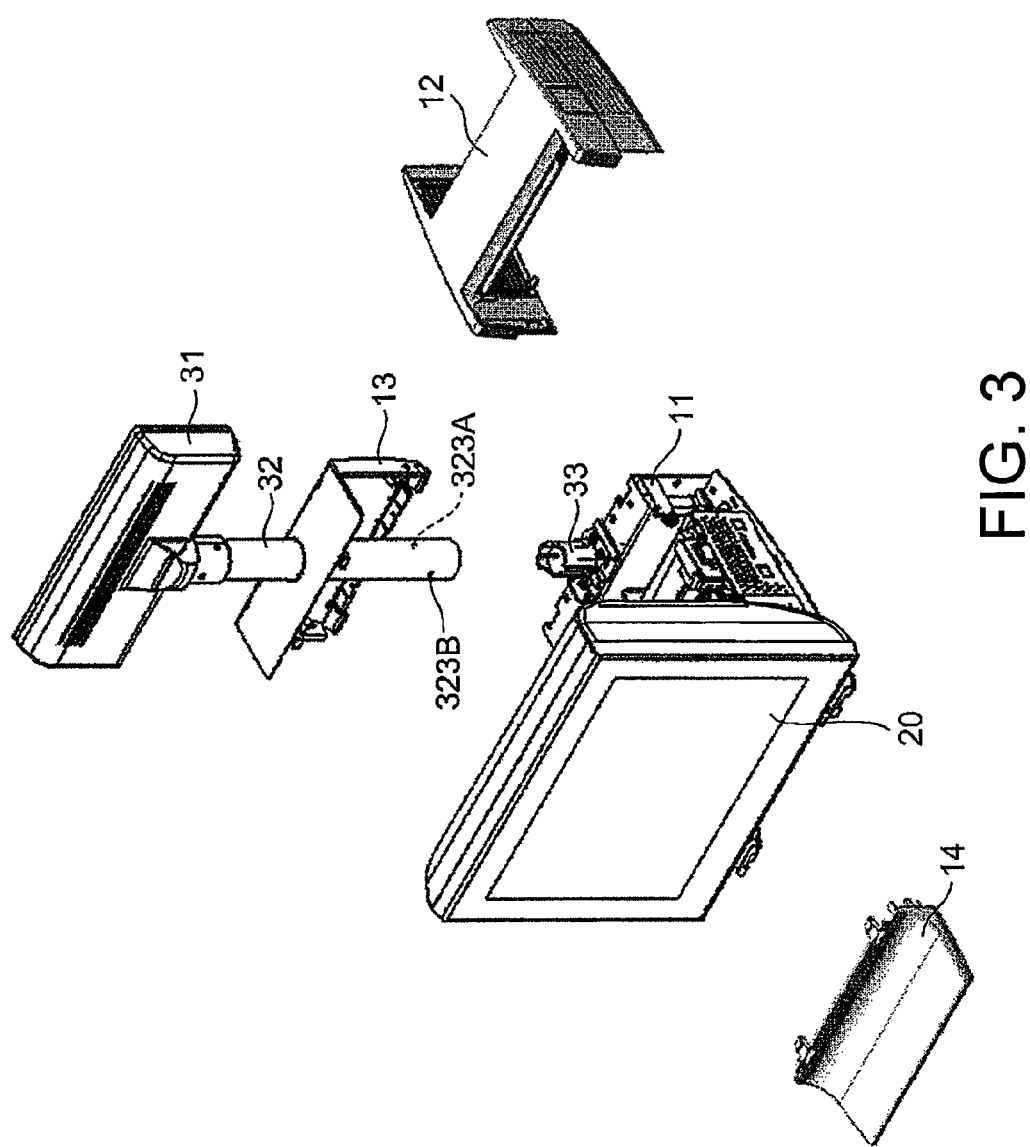
FIG. 3 is a perspective view for illustrating a state in which covers and a part of the customer display device have been removed from the POS terminal device illustrated in FIG. 1.

As illustrated in FIG. 3, the POS terminal device main body 10 is covered by a main cover 12, a rear cover 13, and a front cover 14. Those covers are all removable. The main cover 12, the rear cover 13, and the front cover 14 are all fixed to a frame 11 or the like of the POS terminal device main body 10 via a fitting structure, such as a claw and hole portion, or a dowel and hole portion, and can be easily removed from the POS terminal device main body 10 without the use of any special tools.

The display device 30 includes the display unit 31, a support column 32, and a support base 33. The display unit 31 includes the screen 31A configured to display information. The support column 32 has a tubular shape and is configured to support the display unit 31 at a top end portion of the support column 32. The support base 33 is configured to support the support column and includes a tubular portion that is insertable into and removable from a bottom end portion of the support column 32.

In this example, the support column 32 and the tubular portion of the support base 33 both have cylindrical shapes, but may have a tubular shape with a polygonal cross section, such as a triangle or a square. However, when the support column and the tubular portion of the support base have a tubular shape with a polygonal cross section, horizontal angles to be described later at which the support column can be selectively faced by being reinserted into the support base become limited and intermittent angles.

In this example, the display unit 31 is configured to be rotatable about the support column 32. More specifically, the display unit 31 is rotatable within a range of 270 degrees, that is, left 135 degrees+right 135 degrees.

As is apparent from FIG. 3, the display device 30 is configured such that the support column 32 is reinserted into the tubular portion of the support base 33, to thereby enable the screen 31A of the display unit 31 to be faced in two directions of a customer-side direction and a store-clerk-side direction. Cables to be described later are not illustrated in FIG. 3.

Figure 7:
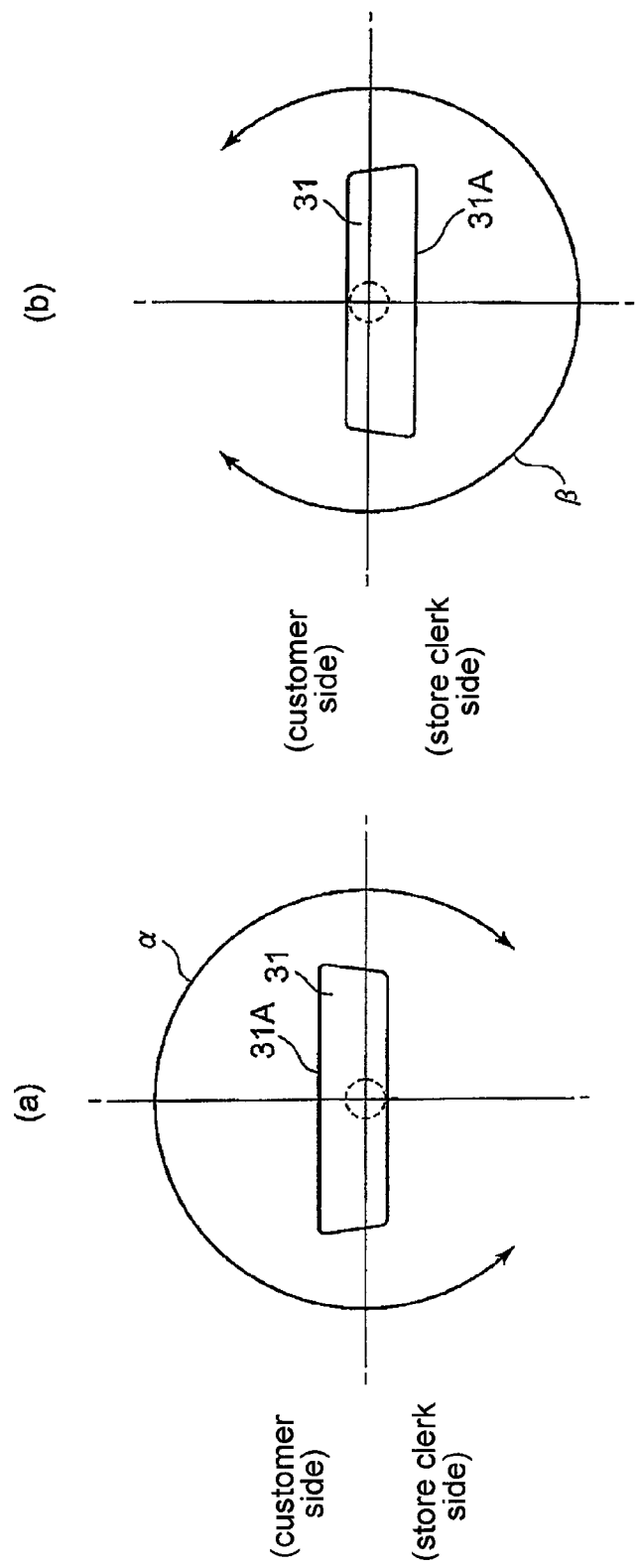
FIG. 7 includes (a) and (b) which are conceptual diagrams for illustrating the structure relating to rotation of a display unit in the display device illustrated in FIG. 1, (a) being an illustration of a state in which the display unit is faced toward the customer side, (b) being an illustration of a state in which the display unit is faced toward the store clerk side.

Here, also with reference to FIG. 7(a) and FIG. 7(b), the display unit 31 is rotatable by 360 degrees or more about the support base 33. This is achieved by combining a rotation range α (270 degrees) about the support column 32 of the display unit 31 when the display unit 31 is faced toward the customer side (FIG. 7(a)) by reinserting the support column 32 into the support base 33, and a rotation range β (270 degrees) about the support column 32 of the display unit 31 when the display unit 31 is faced toward the store clerk side (FIG. 7(b)) by reinserting the support column 32 into the support base 33.

Figure 4:
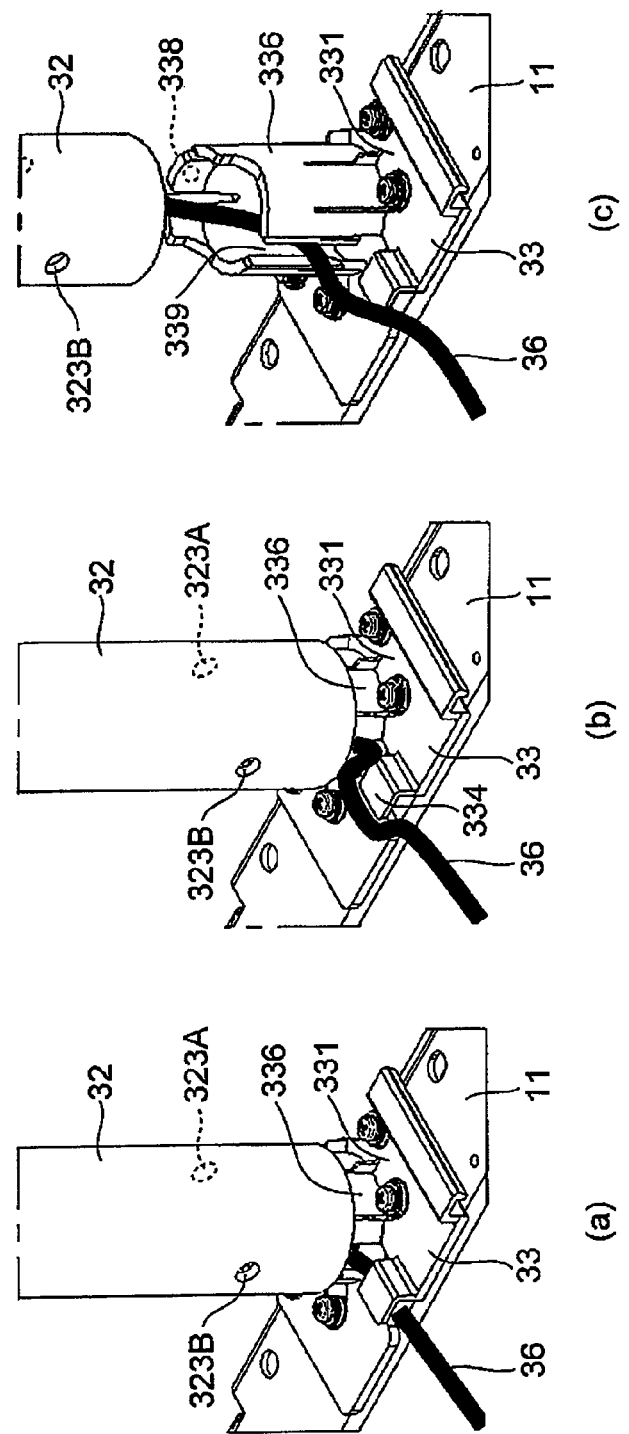
FIG. 4 includes (a) to (c) which are perspective views for illustrating a usage method for the display device (customer display device) illustrated in FIG. 1.

As illustrated in FIG. 4(a) to FIG. 4(c), the support column 32 includes a first fitting hole 323A and a second fitting hole 323B each formed at identical height positions in a tubular axis direction and positions corresponding to two opposite directions having the tubular axis as a center.

Figure 5:
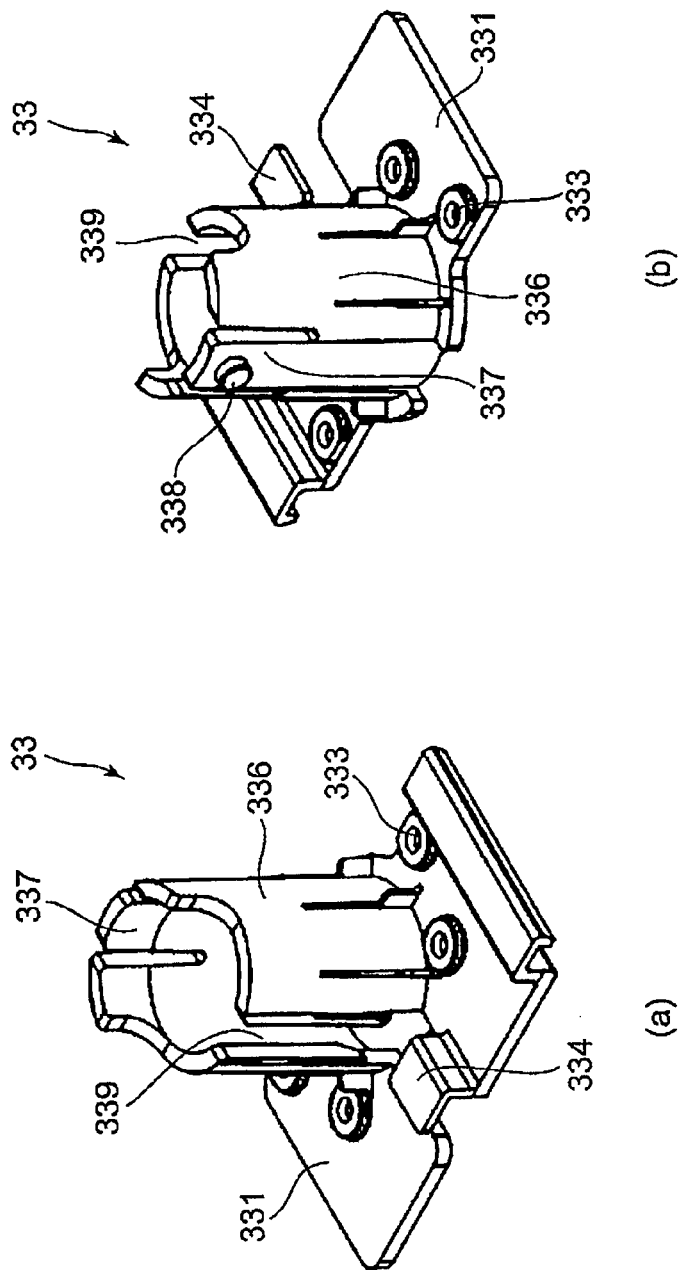
FIG. 5 includes (a) and (b) which are perspective views for illustrating a support base in the display device illustrated in FIG. 1.
Figure 6:
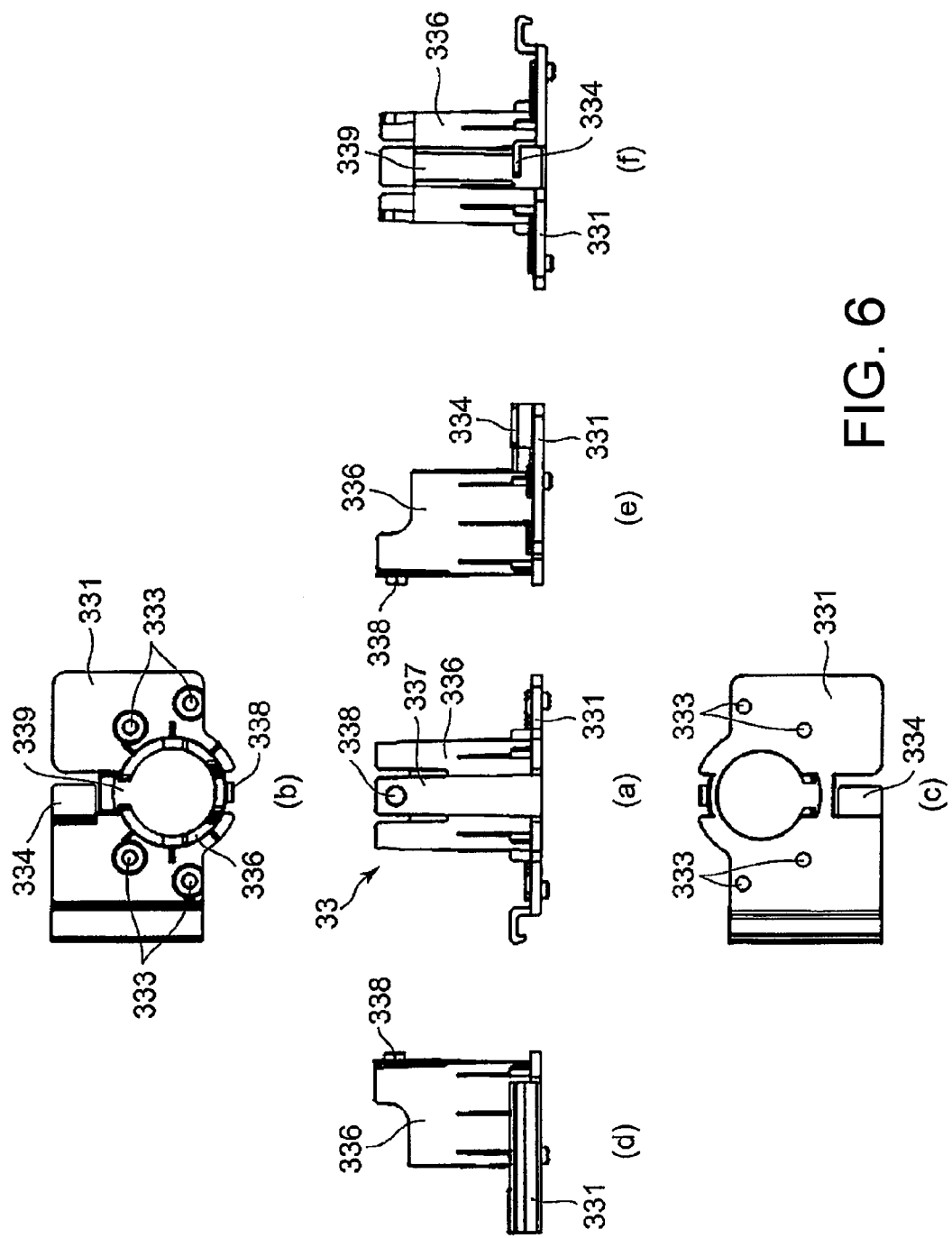
FIG. 6 includes (a) to (f) which are six-side views for illustrating the support base in the display device illustrated in FIG. 1.

Meanwhile, as illustrated in FIG. 5(a) and FIG. 5(b) as well as FIG. 6(a) to FIG. 6(f), the support base 33 in this example is made of a resin, e.g., acrylonitrile butadiene styrene (ABS) resin, and includes a substantially plate-shaped base portion 331, a tubular portion 336 integrally formed on a plate surface of the base portion 331, a single fitting protrusion 338, and a tongue piece 337 that functions as a biasing portion. The support base 33 may be made of a metal, such as a galvanized steel plate, aluminum, or stainless steel instead of a resin.

A plurality of ribs are provided in a radial manner about the base of the tubular portion 336 on the base portion 331. Those ribs function to reinforce the tubular portion 336 and to support the support column 32 fitted into the tubular portion 336.

The fitting protrusion 338 is provided to the tubular portion 336 at a height position corresponding to the first fitting hole 323A and the second fitting hole 323B of the support column 32 in the tubular axis direction.

The tongue piece 337 functions as a biasing portion configured to bias the fitting protrusion 338 in a direction in which the fitting protrusion 338 returns when the fitting protrusion 338 is pushed toward the tubular axis of the tubular portion 336. The tongue piece 337 has a cantilever spring shape formed between slits by forming a pair of the slits on a top end portion of the tubular portion 336. The fitting protrusion 338 is formed in a vicinity of a displacement end of the tongue piece 337. That is, the tongue piece 337 and the fitting protrusion 338 form an integral and single member with the tubular portion 336 of the support base 33. The biasing portion and the fitting protrusion may be members provided separately to the tubular portion of the support base.

When the support column 32 is inserted into the tubular portion 336 of the support base 33, the fitting protrusion 338 of the support base 33 is fitted into one of the first fitting hole 323A and the second fitting hole 323B of the support column, to thereby hold the screen of the display unit 31 (FIG. 1 to FIG. 3) at one of an angle facing the customer side and an angle facing the store clerk side.

In this example, as illustrated in FIG. 1 and FIG. 7(a), when the screen of the display unit 31 is faced toward the customer side, the fitting protrusion 338 enters the first fitting hole 323A, to thereby hold the angle of the support column 32. On the other hand, as illustrated in FIG. 2 and FIG. 7(b), when the screen of the display unit 31 is faced toward the store clerk side, the fitting protrusion 338 enters the second fitting hole 323B, to thereby hold the angle of the support column 32.

Through restriction of the rotation of the support column in this way, even in a case where the display unit is configured to be rotatable about the support column as described in this example, the support column does not rotate together with the display unit when the display unit is rotated. Due to this, the user does not need to perform the laborious task of holding the support column with one hand while rotating the display unit with the other hand and can rotate the display unit with just one hand.

Further, with the above-mentioned fitting, the support column 32 is not only held at a horizontal angle, but also prevented from unintentionally coming out of the tubular portion 336 of the support base 33.

The positions at which the fitting holes are formed in the support column are not limited to two opposite positions as in this example, and the fitting holes may be formed at three or more positions corresponding to angles at which the display unit is to be held.

Further, contrary to this example, while a plurality of fitting protrusions are provided on a tubular inner periphery surface of the support column, the tubular portion of the support base may be provided with a single fitting hole and the biasing portion configured to bias the single fitting hole in a direction in which the single fitting hole returns when the single fitting hole is pushed toward the tubular axis of the tubular portion.

The support base 33 further includes a slit 339 (FIG. 5) formed in the tubular portion 336 for drawing a cable 36 (FIG. 4) wired through a tube inner portion of the support column 32 from the display unit out of the tube inner portion. The support base 33 may include an opening portion at a bottom end portion of the tubular portion 336 in the tubular axis direction for drawing the cable wired through the tubular portion of the support column from the display unit out of the tubular portion. In this example, the support base 33 includes the opening portion in addition to the slit 339. However, a portion past the opening portion is blocked by the frame 11 (FIG. 3) of the POS terminal device main body 10.

The slit 339 is formed for the following reason. The structure of this invention is a structure in which the support column supporting the display unit is taken out from the support base and then returned to the support base after the orientation of the display unit has been changed. The cable 36 (FIG. 4) connected to an electronic circuit or the like in the POS terminal device main body is connected to the display unit and, in order to pull up the support column supporting the display unit, the cable 36 needs to have extra length corresponding to how far the support column is to be pulled up. Therefore, in general, a space is required below the support base 33 to accommodate the extra length of the cable. In contrast, forming slits as in this example obviates the need to secure the space for accommodating the extra length of the cable 36 below the support base 33 and, as a result, the size of the device can be reduced. Further, the cable length can be shortened to the minimum length possible by opening the slits in a direction in which the origin of the wiring is wired (electronic circuit or the like of the POS terminal device in this example) as in this example. The slits may be continuous from the top end to the bottom end of the support base.

The support base 33 further includes screw fastening holes 333 at four positions on the base portion 331 of the support base 33 for fixing the support base 33 to the frame 11 of the POS terminal device and a cable presser 334 configured to hold the cable 36 (FIG. 4) drawn out toward the POS terminal device from the slit 339. The cable presser 334 does not always need to be provided.

In the display device 30 described above, the screen 31A of the display device 31 is changed from a state in which the screen 31A is faced toward the customer side to a state in which the screen 31A is faced toward the store clerk side in the following manner.

The state in which the screen 31A of the display unit 31 is faced toward the customer side, as illustrated in FIG. 1 and FIG. 7(a), is described. During this state, the fitting protrusion 338 has entered the first fitting hole 323A.

First, as described in the following items (1) to (3), the support column 32 integral with the display unit 31 is pulled up from the support base 33.

(1) After the front cover 14 is removed, the main cover 12 and the rear cover 13 are also removed. The following procedure is carried out while maintaining a state in which the rear cover 13 is moved upward with respect to the support column 32, as illustrated in FIG. 3, after being removed from the frame 11.

(2) As illustrated in FIG. 4(b), the cable 36 is taken out from below the cable presser 334 and placed on top of the cable presser 334. At this time, the cable 36 still passes through the slit formed in the tubular portion 336.

(3) Next, the support column 32 integral with the display unit 31 is pulled up while the fitting protrusion 338 inside the first fitting hole 323A of the support column 32 is pushed in with the use of a hard, rod-shaped object, such as a metal, as needed. This state is the state illustrated in FIG. 4(c). The cable 36 passes through the slit 339 formed in the tubular portion 336 also in this state.

Next, the support column 32 integral with the display unit 31 that has been pulled up is rotated (inverted) so that the screen 31A faces the store clerk side. Then, the bottom end of the support column 32 is inserted into the tubular portion 336 of the support stand 33.

When the support column 32 is inserted until the support column 32 rests on the rib of the support base 33, the fitting protrusion 338 enters the second fitting hole 323B with a click sensation. When there is a positional deviation in a circumferential direction, the support column 32 is rotated clockwise and counterclockwise so that the fitting protrusion 338 enters the second fitting hole 323B with the click sensation.

Thereafter, the cable 36 is stored below the cable presser 334. Further, the rear cover 13, the main cover 12, and the front cover 14 are mounted to the POS terminal device main body 10 in the stated order.

As described above and illustrated in FIG. 2 and FIG. 7(b), the display unit 31 is changed to the state in which the screen 31A of the display unit 31 is faced toward the store clerk side.

Thereafter, the display unit 31 is rotated about the support column 32 as needed so that the screen 31A faces an optimal direction.

INDUSTRIAL APPLICABILITY

This invention has been described above with reference to the embodiment, but modifications understandable for a person skilled in the art may be made to the configurations and details of this invention.

For example, this invention is not limited to the POS terminal device, and may be applied to any kind of electronic device having a display device that requires a display screen to be faced in arbitrary directions, or a similar display device.

This application claims priority from Japanese Patent Application No. 2014-221538 filed on Oct. 30, 2014, the entire disclosure of which is incorporated herein.

REFERENCE SIGNS LIST

10 POS terminal device main body
11 frame
12 main cover
13 rear cover
14 front cover
20 display device (store-clerk display device)
30 display device (customer display device)
31 display unit
31A screen
32 support column
323A first fitting hole
323B second fitting hole
33 support base
331 base portion
333 screw fastening hole
334 cable presser
336 tubular portion
337 tongue piece
338 fitting protrusion
339 slit
36 cable

The invention claimed is:

1. A display device, comprising:
  a display unit comprising a screen configured to display information;
  a support column having a tubular shape and being configured to support the display unit at a top end portion of the support column; and
  a support base comprising a tubular portion that is insertable into and removable from a bottom end portion of the support column and being configured to support the support column,
  wherein the display device is configured such that the support column is reinserted into the tubular portion of the support base, to thereby enable the screen of the display unit to be faced toward a plurality of angles having a tubular axis of the tubular portion as a center,
  wherein the tubular portion of the support base comprises a slit for drawing a cable wired through a tube inner portion of the support column from the display unit out of the tube inner portion,
  wherein the slit is opened in a direction in which an origin of the cable is wired, and the slit is continuous from a top end to a bottom end of the support base,
  wherein the support column comprises a plurality of fitting holes formed at identical height positions in a tubular axis direction and at positions corresponding to the plurality of angles having the tubular axis as a center,
  wherein the support base further comprises:
    a single fitting protrusion formed in the tubular portion at a height position corresponding to the plurality of fitting holes of the support column in the tubular axis direction; and
    a biasing portion configured to bias the single fitting protrusion in a direction in which the single fitting protrusion returns when the single fitting protrusion is pushed toward the tubular axis of the tubular portion,
  wherein, when the support column is inserted into the tubular portion of the support base, the single fitting protrusion of the support base is fitted into any one of the plurality of fitting holes of the support column, to thereby hold the screen of the display unit at any one of a plurality of angles,
  wherein the biasing portion of the support base has a cantilever spring shape formed between slits by forming a pair of slits in a top end portion of the tubular portion,
  wherein the single fitting protrusion is formed in a vicinity of a cantilever spring-shaped displacement end of the biasing portion, and
  wherein the biasing portion and the single fitting protrusion comprise an integral and single member with the tubular portion of the support base.

2. The display device according to claim 1, wherein the support base further comprises, at a bottom end portion of the tubular portion in a tubular axis direction, an opening portion for drawing a cable wired through a tube inner portion of the support column from the display unit out of the tube inner portion.

3. The display device according to claim 1,
  wherein the support base further comprises a base portion to be joined to a bottom end of the tubular portion, and
  wherein the base portion comprises a screw fastening hole for mounting the support base to another device.

4. The display device according to claim 1,
  wherein the display unit is rotatable about the support column.

5. The display device according to claim 4,
  wherein the display unit is rotatable about the support column within a range of 180 degrees or more and less than 360 degrees, and
  wherein the display unit is configured to be rotatable about the support base by 360 degrees or more by combining a plurality of angles at which the support column is faced with respect to the support base that are achieved by reinserting the support column into the support base, and the range of 180 degrees or more and less than 360 degrees within which the display unit is rotatable about the support column.

6. A POS terminal device comprising the display device according to claim 1.

7. The POS terminal device according to claim 6, further comprising:
- a store-clerk display device comprising a screen configured to display information; and
- a customer display device configured by the display device,
- the customer display device being configured such that the support column is reinserted into the tubular portion of the support base, to thereby enable the screen of the display unit to be faced at least in directions opposite to and identical to the screen of the store-clerk display device.

* * * * *